United States Patent Office 2,901,012
Patented Aug. 25, 1959

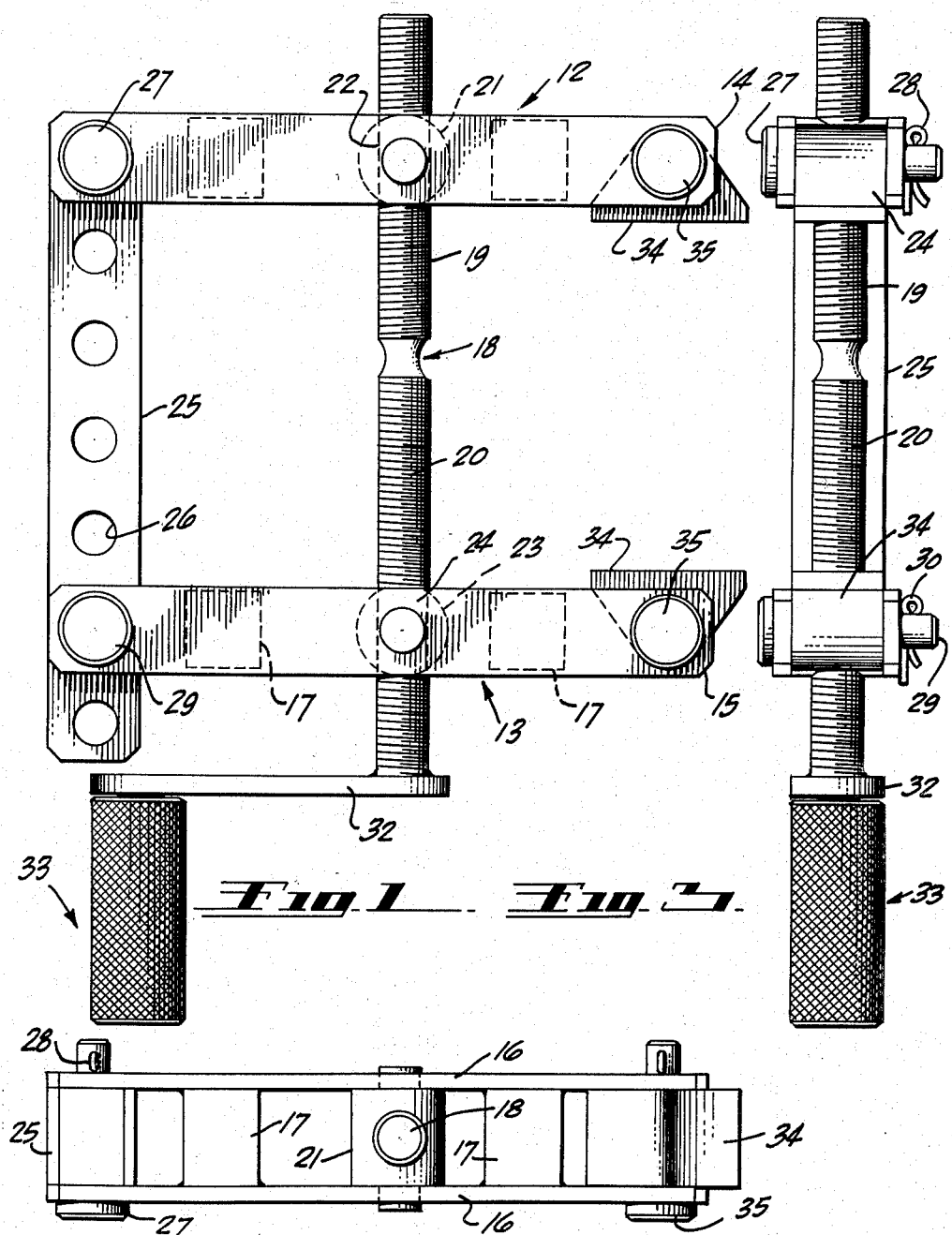

2,901,012

EXPANSION OR CONTRACTION COMPENSATING CLAMP

Thayer S. Crispin, Malibu, Calif., assignor to Douglas Aircraft Company, Inc., Santa Monica, Calif.

Application May 21, 1956, Serial No. 586,153

4 Claims. (Cl. 144—302)

This invention relates to clamps and particularly to clamps of the type which are used to hold parts together while the latter are being subjected to elevated temperatures.

An example of this use occurs in the thermal curing of plastic parts, wherein a pair of plastic shaping dies must be tightly held conformingly against a shaped plastic article in a curing oven the temperature of which rises during the curing process. During such curing, if the ordinary clamp is employed, the oven heat expands the clamp in such a way that the clamp-jaws lose their grip and often even fall off the articles being clamped.

Contrary to the concept and action of the conventional clamp, the present one is so constructed that, as the temperature to which it is exposed rises, the clamp, instead of loosening its grip, actually grips the work with an ever increasing force.

Briefly, to these and other ends, the clamp essentially comprises a pair of parallel spaced levers pivoted intermediate their ends to a fulcrum rod which in its initial position, with the clamp unclamped, is disposed rectangularly to the levers and is so threaded and rotatable as to also enable "fine" adjustments of the jaws with respect to the work, the distal ends of these levers also being pivotally connected to each other by a compression bar which, in its initial or unclamped position extends rectangularly to the levers. The fulcrum rod or threaded tension member is, according to this invention, composed of a metal having a rather low conductivity and coefficient of linear expansion, whereas the compression bar is composed of a metal having a much higher thermal conductivity and coefficient of linear expansion. By way of example, the tension member may consist of an alloy of iron, such as stainless steel or Monel metal, and the compression member may consist of an aluminum alloy. Hence, when the clamp is employed in a curing oven, for example, and the curing temperature is elevated, the aluminum compression bar, at the extremities of the levers that lie opposite the work-engaging ends, expands much more than does the fulcrum rod, thereby "swinging" the work-engaging ends of the levers closer together and tighter against the work.

The presently-preferred embodiment of these, and other, concepts is illustrated in the accompanying drawings and described hereinafter in conjunction therewith, but it is to be understood that the scope of the invention is not limited to this typical embodiment and is to be determined by the scope of the subjoined claims.

In these drawings:

Figure 1 is a fragmentary side view of the clamp

Figure 2 is a top plan view of same and

Figure 3 is an end view of same, sighting from the right in Figure 1.

The clamp-construction illustrated comprises a pair of spaced, normally substantially parallel arms, constituted by an upper lever unit 12 and a lower lever unit 13. Levers 12 and 13 terminate rightwardly in free work-engaging end portions 14 and 15, their opposite ends being connected as, and by, means later described. Each lever unit 12 and 13 consists essentially of a pair of spaced parallel plates 16 rigidity united by spacers 17 welded thereto.

Upper and lower levers 12 and 13 are fulcrumed intermediate their ends and, concurrently, pivotally connected together by means of a tension member 18. The latter is, in its upper half, threaded in the left-hand direction as by threads 19 and is threaded in its lower half in the right-hand direction as by threads 20. A cylindric trunnion member 21 with a left-hand threaded aperture 22 for receiving the upper end of tension rod 18, is pivotally mounted between the plates 16 of the upper lever unit 12, and another cylindric trunnion member 23, with a right-hand threaded aperture 24 receiving the lower end of tension rod 18, is similarly pivotally mounted between the plates 16 of the lower lever unit 13.

Upper and lower lever units 12 and 13 are pivotally connected at the extremities thereof which are opposite to the work-engaging, or jaw ends, by means of a compression member 25, provided intermediate its ends with a series of equidistantly spaced adjustment apertures 26, through each of the upper ones of which a pivot pin 27 is adapted to pass as well as being passed through the correspondingly apertured plates 16 of the upper lever unit 12, and is cotter-pinned as at 28. Through the lower apertures 26 and the plates 16 of lower lever 13 is similarly passed a pivot pin 29, cotter pinned as at 30.

Large magnitude adjustments of the gap between the work engaging ends of levers 12 and 13 can therefore be effected by means of the pivot pins 27 and 29 and apertures 26, whereas small magnitude clamping and unclamping adjustments can be made by means of the reversibly rotary, threaded tension member 18. Rotation of the latter may be effected by means of an actuator arm 32 angularly attached to the lower end of rod 18 and bearing a handle-unit 33 at its free end for facilitating rotation.

Each of the work-engaging ends of the lever units 12 and 13 bears a jaw-cheek 34 which is pivotally mounted between the plates 16 by means of a pivot pin 35 cotter pinned thereto as shown.

In order to achieve one of the main objectives of the invention, the tension rod 18 is composed of a material having a certain coefficient of thermal linear expansion, such as a suitable steel, whereas the compression bar 25 is composed of a different material such as an aluminum alloy, having a coefficient of thermal linear expansion greater than that of rod 18.

Bar 25 is thus primarily a thermally activated actuator responsive to elevations of temperature to which the clamp is exposed, as in a baking oven for curing plastic components clamped together by the present clamp. Since actuator bar 25 linearly expands more per degree of temperature elevation than does rod 18, the actuator therefore urges the distal ends of members 12 and 13 apart, thereby swinging the ends 14 and 15 closer together upon rise in temperature. The work held between jaw-cheeks 34, 34 is hence, up to a certain limit, held the tighter by the clamp the higher the temperature to which it is exposed.

Among the steels or iron alloys preferred for constituting the tension member 18 may be mentioned "Monel metal," a low carbon steel, and stainless steel. Since Monel metal, employed as the tension rod, has a much lower coefficient of expansion than the other ferrous materials, it hence creates a greater differential with the aluminum alloy bar 25, resulting in the application of a greater force upon the work.

It is to be understood that materials other than those specified herein may well be employed for the tension and compression members, so long as these materials incorporate the principle of differential expansion and are relatively arranged as herein contemplated.

I claim:

1. In a clamp, the combination of: a pair of spaced levers each having a work-engaging end and an opposite end; a fulcrum member pivotally connecting said levers intermediate their ends; and a compression member extending between said opposite ends and pivotally connected thereto; said compression member having a higher coefficient of linear thermal expansion than that of the fulcrum member; whereby to approach said work-engaging ends closer together upon augmentation of the temperature to which said clamp is exposed.

2. A clamp, comprising: a pair of substantially parallel spaced levers each having a work-engaging end and an opposite end; a heavy-metal fulcrum member pivotally connecting said levers intermediate their ends; and extending in a direction transverse thereof; and a compression member composed of a light-metal alloy extending substantially rectangularly between said opposite ends and pivotally connected thereto; whereby to effect approach of said work-engaging ends closer together upon elevation of the temperature to which said clamp is exposed.

3. A clamp, comprising: a pair of spaced levers each having a work-engaging end and an opposite end; a ferrous fulcrum member pivotally connecting said levers intermediate their ends; and an aluminum alloy compression member extending between said opposite ends and pivotally connected thereto; whereby to effect approach of said work-engaging ends closer together upon elevation of the temperature to which said clamp is exposed.

4. In a clamp, the combination of: a pair of substantially parallel spaced levers each having a work-engaging end and an opposite end; a first rigid elongate member disposed intermediate the ends of said levers and pivotally connected at each of its opposed ends to the adjacent lever, thus to constitute said elongate member, dually, a fulcrum element and a tension element. and a second, rigid elongate member disposed to extend transversely between the aforesaid opposite ends, said second member having its ends pivotally connected to the adjacent ends of said levers; said second member being composed of a material having a higher thermal conductivity and linear coefficient of thermal expansion than those of the first member, whereby to dually constitute said second member in effect a thermal actuator and also a compression-member; thereby to effect approach of said work-engaging ends closer together upon elevation of the temperature to which said clamp is exposed.

References Cited in the file of this patent

UNITED STATES PATENTS

| | | |
|---|---|---|
| 781,958 | Knoke | Feb. 7, 1905 |
| 952,182 | Bouma | Mar. 15, 1910 |
| 968,038 | Everest | Aug. 23, 1910 |
| 1,031,049 | Counzelman | July 2, 1912 |
| 1,346,236 | Muller | July 13, 1920 |
| 1,840,724 | Koehring | Jan. 12, 1932 |
| 2,395,607 | Aalberg | Feb. 26, 1946 |
| 2,761,475 | La Hayne | Sept. 4, 1956 |